United States Patent [19]

Henning et al.

[11] Patent Number: 5,049,887
[45] Date of Patent: Sep. 17, 1991

[54] TARGET RANGE DETECTOR WITH MOVING TARGET INDICATION

[75] Inventors: Michael R. Henning, Crozet; Thomas M. Woolfolk, Gordonsville, both of Va.

[73] Assignee: Sperry Marine Inc., Charlottesville, Va.

[21] Appl. No.: 598,529

[22] Filed: Oct. 16, 1990

[51] Int. Cl.⁵ .............................................. G01S 13/64
[52] U.S. Cl. ................................... 342/110; 342/105; 342/28; 342/21
[58] Field of Search .................... 342/110, 105, 28, 21

[56] References Cited
U.S. PATENT DOCUMENTS

| | | | |
|---|---|---|---|
| 4,146,890 | 3/1979 | Klensch | 342/105 |
| 4,695,752 | 9/1987 | Ross et al. | 342/21 |
| 4,975,703 | 12/1990 | Delisle et al. | 342/21 |

Primary Examiner—Gilberto Barron, Jr.
Attorney, Agent, or Firm—Seymour Levine

[57] ABSTRACT

An apparatus for determining a target position within a selected range segment includes a range gate generator which provides a range gate signal that enables a detector for a time interval corresponding to the range segment and a signal generator, responsive to the range gate signal, which provides a signal having an amplitude which varies with time. The output signal of the signal generator is sampled by a sample and hold circuit. A control signal generator enabled during the range gate interval couples a switching signal to the sample and hold circuit which, upon the reception of a target reflected signal, causes the sample and hold circuit to switch from the sampling mode to the hold mode. The signal amplitude in the hold mode is a representation of the target position within the range gate. Range rate is determined from a knowledge of the elapsed time between range gates corresponding to the same range segment and the difference in positions within the range gates established by the sample and hold circuit when switched to the hold mode upon receptions of the target reflected signals.

7 Claims, 2 Drawing Sheets

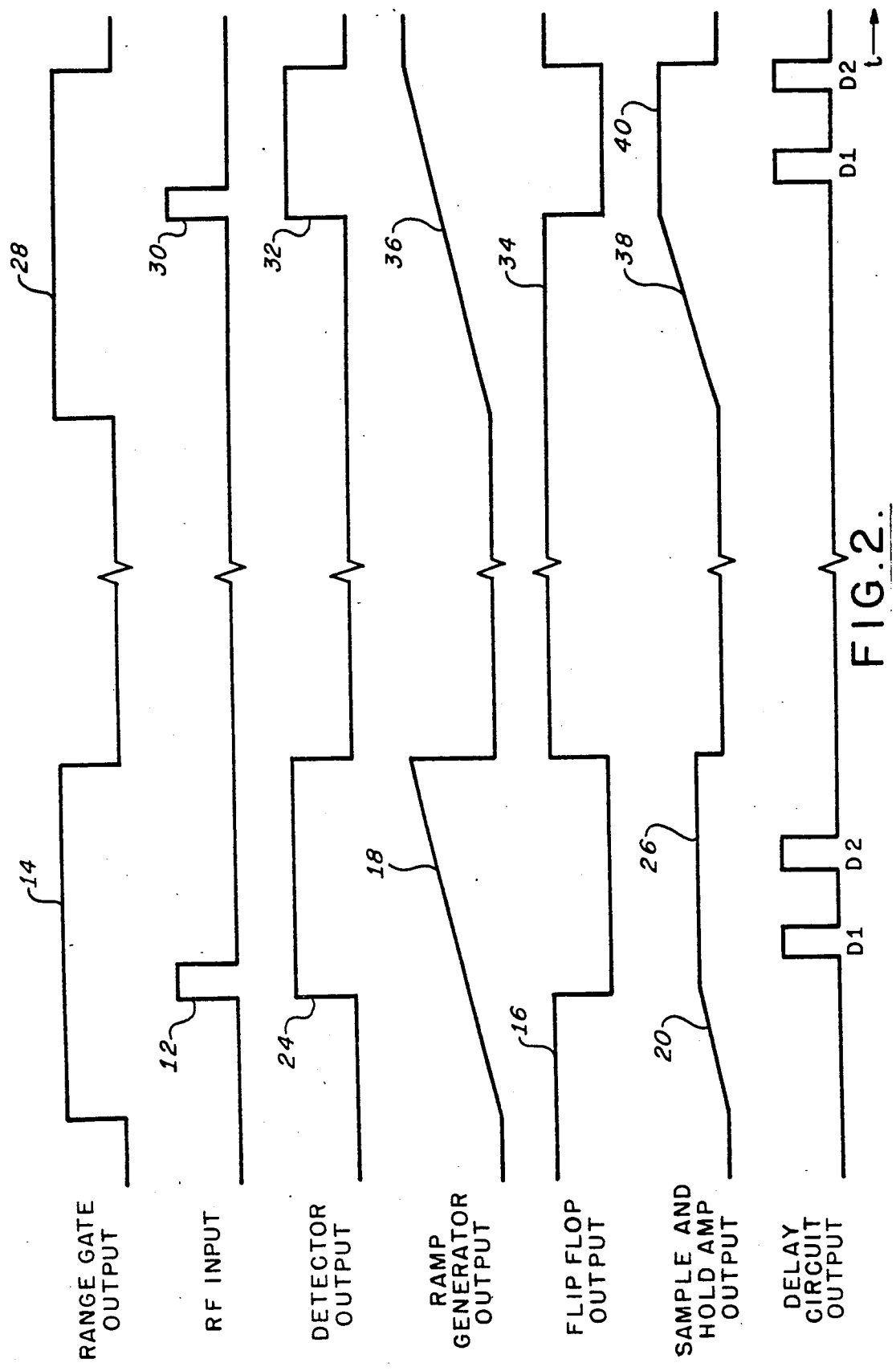

TARGET RANGE DETECTOR WITH MOVING TARGET INDICATION

BACKGROUND OF THE INVENTION

1. Field of the Invention

The present invention relates to target ranging and moving target indication and more particularly to a target ranger and moving target indicator for systems requiring range information to a high degree of accuracy and detection of slowly moving targets.

2. Description of the Prior Art

An intrusion detection system determines when the periphery of a protected area has been crossed. Protection of some areas, however, require a determination of intruder penetrator distance to within a few feet and the rate of penetration into the penetrated area, which may be between one and five feet per second for a crawling or walking intruder. Pulse doppler radar techniques may be employed for intruder detection. These systems, however, require extremely wide system bandwidths and extremely narrow doppler filter bandwidths to achieve a desired distance resolution and intrusion rate. In addition, pulse doppler systems may be jammed and thus rendered inoperative.

Impulse radar systems, which transmit pulses having pulse widths in the order of two nano-seconds without the aid of a carrier signal are substantially jam proof. Such systems provide highly accurate intruder detectors. It is well known that the bandwidth established by the generation of a two nanosecond pulse is in the order of 500 Mc. If the 300 Mc spectral line is utilized for the doppler measurement an intruder walking at five feet per second would cause a doppler frequency shift of approximately three cycles per second. In a practical system the width of the spectral lines exceed three cycles per second, thus the rate of intrusion of a walking or crawling intruder cannot be measured by such a system.

It is therefore an object of this invention to provide an intrusion detection system capable of determining intrusion rate after an intruder has penetrated the periphery of a protected area.

It is another object of this invention to provide an intrusion detection system capable of determining the position of an intruder within the protected area to an accuracy of less than one feet.

SUMMARY OF THE INVENTION

A target range detector in accordance with the principles of the present invention utilizes a detector which provides an output signal when a pulse signal, reflected from a target that has penetrated the periphery of the protected area, is received. This output signal is coupled to the clock terminal of a D-type flip-flop. A range gate generator provides an enabling signal to the flip-flop for a time interval that is representative of a range segment within the protected area. A ramp generator coupled to the range gate generator provides a signal, commencing with the initiation of the range gate signal, which has an amplitude that increases with time. A sample and hold circuit, coupled to receive the output signal and the ramp signal, provides an output signal that tracks the ramp signal until switched to the hold mode by a signal received from the flip-flop after it is clocked by the leading edge of the output signal from the detector. The amplitude of the signal at the output terminal of the sample and hold circuit, when it is in the hold mode, is representative of the target position within the range segment. Should this target position change for subsequent detections within the range segment the signal amplitude at the output terminal of the sample and hold circuit, when in the hold mode, will be increased or decreased, depending upon the movement and direction of the target. These signals may then be processed to determine both the location of the target within the range segment and the rate of penetration in the protected area of the target.

BRIEF DESCRIPTION OF THE DRAWINGS

FIG. 2 is a sequence of wave forms useful for explaining the invention.

DESCRIPTION OF THE PREFERRED EMBODIMENT

Figure 1:
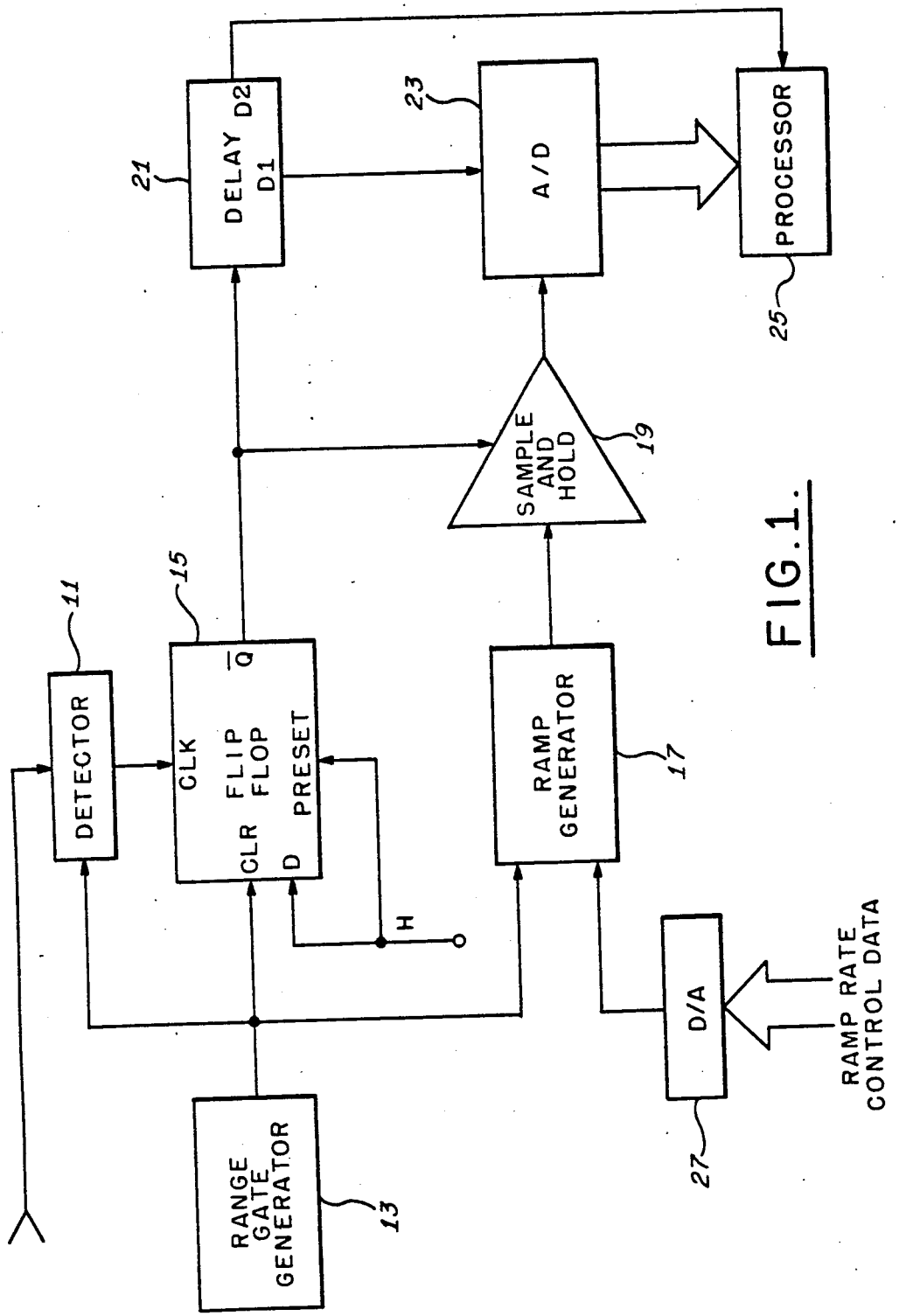
FIG. 1 is a block diagram of a preferred embodiment of the invention.

The preferred embodiment and its operation will be described with reference to FIGS. 1 and 2. A signal detector 11, enabled by a range gate signal 14 from a range gate generator 13 for a preselected time interval, is coupled to receive reflected pulse signals 12 from a target which were provided by a transmitter not shown. The output terminal of the detector is coupled to the clock terminal of a D-type flip-flop 15 having the D and preset terminals coupled to receive a high level signal, and the clear terminal coupled to the output terminal of the range gate generator 13. Upon initiation of the range gate 14 by the range gate generator 13 a ramp signal generator 17, coupled to receive the range gate signal, provides a signal 18 having an amplitude that increases with time to a sample and hold circuit 19. The Q-bar output of the flip-flop 15 provides a control signal 16 to the sample and hold circuit 19. Prior to the generation of a range gate signal by the range gate generator 13 the clear terminal of the flip-flop 15 is at a low level and, as previously stated, the preset terminal is coupled to receive a high level signal. With this condition the Q-bar terminal is at a high level and remains at this level independent of signal amplitudes at the clock and D terminals. This condition is not altered when the high level range gate signal 14 is coupled to the clear terminal and the flip-flop 15 is enabled. Thus the sample and hold circuit is maintained in the sampling mode and provides a signal 20 at its output terminals which tracks the signal 18 at the output terminal of the ramp generator 17. The high level signal at the clear terminal of the flip-flop 15 causes the flip-flop to be responsive to signal transitions form low to high at the clock terminal. When a return pulse, represented by the RF input 12 in FIG. 2, is received by the detector 11, a low to high transition 24 is coupled from the output terminal of the detector 11 to the clock terminal of the flip-flop 15, causing a low level signal to be coupled to the Q-bar terminal of the flip-flop 15. This low level signal switches the sample and hold circuit 19 from the sampling mode to the hold mode, thus establishing a signal with a constant amplitude 26 at the output terminal of the sample and hold circuit 19. The level of this constant amplitude signal 26 is representative of the position of the target within a range gate represented by the range gate output signal 14. The Q-bar terminal from the flip-flop 15 is also coupled to a delay circuit 21 which provides a signal to enable an analog-to-digital converter 23 after a sufficient time has elapsed from the high to low transition at the Q-bar terminal of the flip-flop 15 to permit the sample and hold circuit 19 to settle at the constant value 26. Delay line 21 also couples a signal to a digital processor 25 after a delay sufficient to permit the analog-to-digital converter 23 to complete the analog-to-digital conversion. Processor 25 then performs the necessary operations upon a digital signal coupled from the analog-to-digital converter 23 to establish the target range. Thus, the signal at the g-bar terminal is a control signal which controls the mode of the sample and hold circuit 19, enables the A/D converter 23, and signals the processor to commence processing the output signal of the sample and hold circuit.

Range accuracy and range resolution are functions of signal amplitude discrimination at the output of the sample and hold circuit 19. This signal discrimination is a function of the slope of the ramp signal provided the ramp generator 17. To provide a system with variable range accuracy and range resolution, the ramp generator may be responsive to slope selecting analog signals. As shown in FIG. 1, these signals may be provided by a digital-to-analog converter 27 coupled to receive digital slope selecting signals from a control unit, not shown.

The above described detection process is repeated for a subsequent transmitted signal reflected from the target within a range gate 28 provided by the range gate generator 13 that corresponds to the same range segment within the protected area. If the target position within the range gate, as indicated by the return pulse 30, has moved, the low to high transition 32 causes the transition 34 at the Q-bar output of the flip-flop 15 to occur at a time, relative to the commencement of the time increasing amplitude signal 36, that differs from the time interval between the commencement of the time increasing amplitude signal 18 and the Q-bar transition 16 that results from the reception of the reflected signal 12. Thus, the sampling 38 of the ramp generator 17 output signal is terminated at an amplitude 40 which differs from the previous amplitude termination 26. This amplitude difference is a measure of the distance moved by the target in the time interval between the generation of the two range gates. Since this time interval is known, processor 25 utilizes the digital signals representative of these two amplitudes to determine the range rate of the target.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A range determining apparatus comprising:
    means for providing a gating signal having a predetermined timed interval which is representative of a predetermined range segment;
    means enabled by said gating signal for receiving a signal reflected from a target and for providing a detection signal in response to said signal reflected from said target;
    means enabled by said gating signal and responsive to said detection signal for providing a control signal having first and second levels;
    means responsive to said gating signal for providing an output signal having an amplitude which varies with time;
    means coupled to said output signal means and said controlled signal means for sampling said output signal when said control signal is at said first level and terminating said sampling when said control signal is at said second level, said output signal amplitude, upon termination of said sampling, being representative of said target position within said range segment.

2. An apparatus in accordance with claim 1 further including processor means coupled to said sampling means for establishing range and range rate of said target from signal amplitudes provided by said sampling means.

3. An apparatus in accordance with claim 2 further including;
    means coupled between said output signal means and said processor means for converting analog signals to digital signals;
    means responsive to said second level of said control signal for activating said converting means at a first predetermined time after reception of said second level of said control signal and for activating said processor means at a second predetermined time after reception of said second level of said control signal.

4. An apparatus in accordance with claim 1 wherein said output signal means is a ramp generator.

5. An apparatus in accordance with claim 4 wherein said ramp generator has selectable amplitude/time slopes and further including means coupled to said ramp generator for selecting said amplitude/time slope.

6. An apparatus in accordance with claim 1 wherein said control signal means is a D-type flip-flop.

7. An apparatus in accordance with claim 1 wherein said detection signal means includes a tunnel diode.

* * * * *